June 6, 1950  R. S. PHILBRICK  2,510,414
FLEXIBLE COUPLING FOR SHAFTS
Filed Jan. 5, 1949

INVENTOR.
Robert S. Philbrick
BY
ATTORNEYS.

Patented June 6, 1950

2,510,414

UNITED STATES PATENT OFFICE 2,510,414

FLEXIBLE COUPLING FOR SHAFTS

Robert S. Philbrick, Bound Brook, N. J., assignor to Sier-Bath Gear and Pump Co., Inc., North Bergen, N. J., a corporation of New Jersey Application January 5, 1949, Serial No. 69,394

1 Claim. (Cl. 64—9)

This invention relates to flexible shaft couplings particularly of the self aligning gear type and has for its primary object to provide such a coupling of high quality which is economical to manufacture and of such improved construction as to facilitate in the speed of disconnecting in the maintenance of equipment with which it is used.

More particularly the main object of the invention is to provide a gear type self aligning shaft coupling with a single piece sleeve element having seal retainer groove and retainer seat larger than the diameters of the internal teeth which allows the internal teeth, within the sleeve for both shaft hub elements, to be cut simultaneously by broaching instead of the usual gear cutting machinery thereby saving time in manufacturing. Incident thereto disassembly of the coupling is facilitated by removing a snap retainer ring in one end and sliding the sleeve off the two shaft hubs.

Further objects, advantages and details will appear in the following specification supplemented by the accompanying drawings illustrating a highly practical form of shaft coupling in accordance with my invention, in which drawings.

Figure 1:
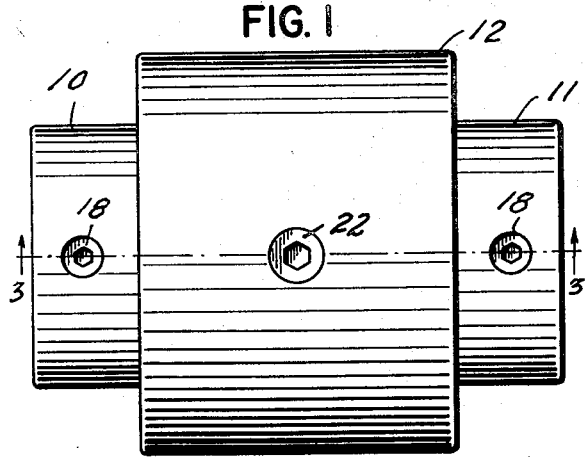
Fig. 1 is a side elevation view of a self aligning gear type coupling in accordance with my invention.
Figure 2:
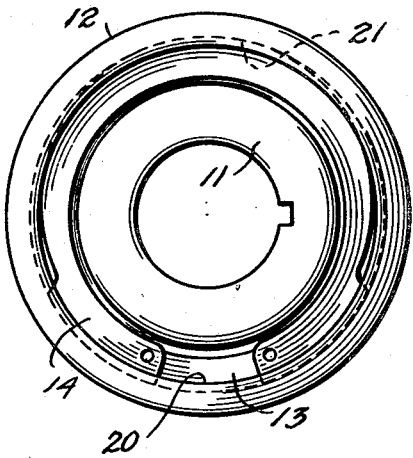
Fig. 2 is an end elevation thereof.
Figure 3:
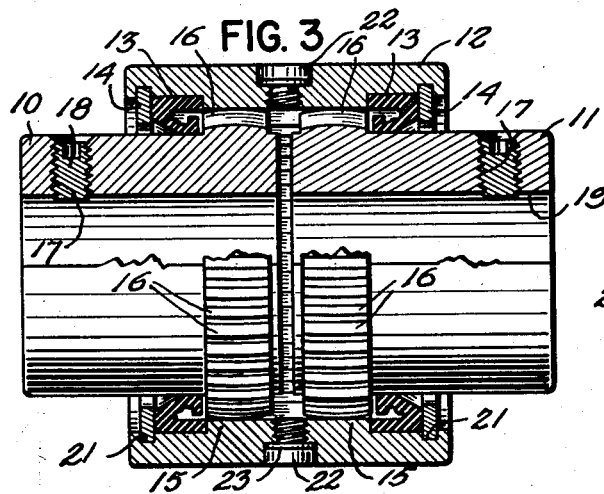
Fig. 3 is a transverse sectional view thereof taken on line 3—3 of Fig. 1.
Figure 4:
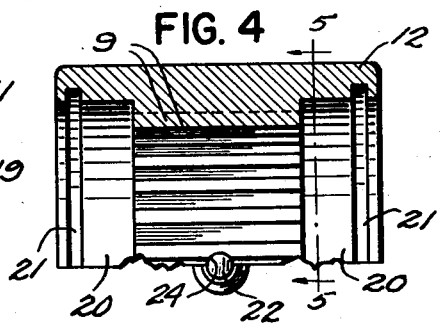
Fig. 4 is a fragmental longitudinal sectional view of the sleeve member of the coupling.

Referring to the drawing, in general the flexible shaft coupling in accordance with my invention comprises three main elements—two similar complementary shaft hub members, 10 and 11, and a unitary sleeve member 12, with cooperating seal packer rings 13 and retaining rings 14 in the ends of the sleeve member cooperating with the shaft hub members to maintain the coupling elements assembled and provide a lubricant tight casing.

Shaft hub members 10 and 11 each comprises a cylindrical collar formed with an inner flange 15 having peripheral gear teeth 16 and the other end thereof has threaded bore 17 for a set screw 18 to project therethrough into its inner shaft engaging cylindrical bore 19 of a diameter corresponding with and for singly engaging the shaft end upon which the hub is to be mounted and retained by the set screw 18.

Figure 6:
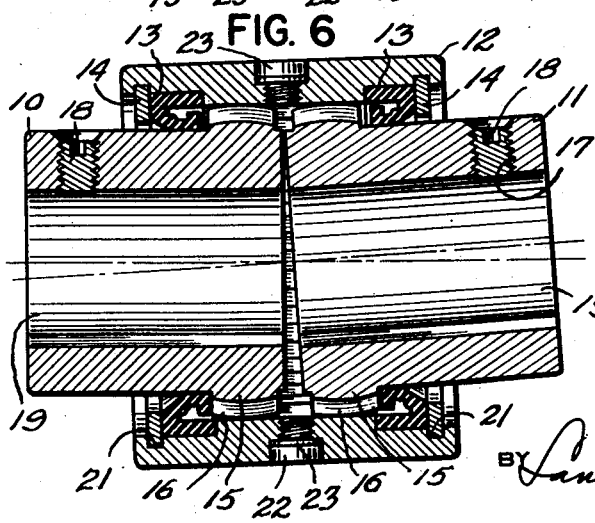
Fig. 6 is a longitudinal sectional view of the coupling similar to Fig. 3 but showing the shaft hub members in angular relation with respect to each other to illustrate the operation of the coupling when the shafts connected thereby are not in alignment.

The particular feature of my invention resides in the cooperating sleeve member 12, and its simplicity of construction rendering it less expensive to manufacture and a time saver in maintenance of equipment with which the shaft coupling is associated in use thereof. This sleeve has internal gear teeth 9 extending longitudinally a distance sufficient for engagement with the gear teeth 16 of both hubs 10 and 11 and for permitting angular displacement of the hubs and the shafts carrying them as illustrated in Fig. 6. The sleeve is provided with sealing packing ring channels 20 of greater diameter than the gear teeth, for reception of the sealing packing rings 13 and the grooves 21 are formed within these channels for retaining the rings 14 for retaining the sealing packing rings 13 in place. With this construction the gear teeth 9 in the inwardly projecting portion between the packing ring channels 20 may be easily formed by broaching operations cutting the teeth throughout their entire length for both hub members 10 and 11 instead of more complicated operations with gear cutting machinery or double operations as is the usual procedure where the sleeve is formed in two parts, one for each hub, and the two parts provided with flanges which are secured together with as many as eight or more bolts, requiring drilling, reaming and counter boring of the bolt holes in the flanges, all of which is eliminated by the improved coupling in accordance with my invention.

Figure 5:
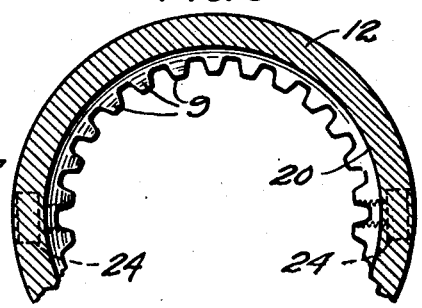
Fig. 5 is a transverse sectional view taken on line 5—5 of Fig. 4.

Sleeve 12, in midway positions on opposite sides is provided with threaded openings 24 for inserting lubricant within the casing provided by the sleeve and sealing packing rings 13. As best shown in Fig. 5 these openings preferably enter the sleeve casing at the base of teeth 9, and oil plugs 22 are provided in the form of set screws with a sealing ring 23 under each of their heads which retain the plugs in place and prevent leakage of lubricant. The sealing packing rings 13 are preferably of a readily obtainable commercial design such as disclosed in the patent to Leistensnider et al. 2,372,095 of March 20, 1945, and operate to seal the lubricant in the sleeve casing and cooperate with the hub flanges 15 to prevent displacement of the sleeve from the hubs 10 and 11. Retaining rings 14 are likewise preferably of a readily obtainable commercial design, known as "Truarc" retaining rings marketed by Waldes Koh-I-Nor Inc., No. 22, Long Island City, N. Y.; they are of spring construction and operate to securely lock the packing rings 13 in place and thus the entire coupling assembled.

When it is desired to disassemble the coupling, all that is necessary to do is to remove one of the retaining rings 14 and the packing ring 13 at one end of sleeve 12 and slide the sleeve, with the rings at the other end in place, off from the gear teeth 16 and beyond both hubs 10 and 11. The coupling is as easily reassembled.

From the foregoing the compactness of the coupling and its simplicity are readily apparent as well as labor saving in construction and ease of assembling and disassembling in maintenance of equipment with which it is used.

Having described a highly satisfactory construction of self aligning gear type of flexible coupling in accordance with my invention, it is to be understood that various modifications may be made within the scope of the following claim.

I claim:

A flexible shaft coupling of the self aligning gear type comprising, a pair of complementary shaft end hubs each having a collar with gear teeth on the adjacent ends of the hubs, a one piece cylindrical sleeve having internal gear teeth extending lengthwise over and in engagement with the gear teeth on both the hubs, said sleeve having sealing ring annular channels in the ends thereof of a greater diameter than the internal gear teeth therein and extending outwardly to the ends of the sleeve permitting the sleeve to slide longitudinally onto or from the gear teeth on the hubs in either direction, a sealing packer ring in each of said sleeve channels engaging the corresponding hub member adjacent to the gear teeth on the hub, said packers providing a fluid seal for the members of the coupling for maintaining a lubricant in the sleeve, said sleeve having a sealing ring groove in each of the channels beyond said packer rings, and a spring retaining ring in each of said grooves for holding the packing rings in place and maintaining the coupling assembled.

ROBERT S. PHILBRICK.

REFERENCES CITED

The following references are of record in the file of this patent:

UNITED STATES PATENTS

| Number | Name | Date |
|---|---|---|
| 2,303,813 | Barcus | Dec. 1, 1942 |
| 2,380,113 | Kuhns | July 10, 1945 |